United States Patent
Yamazaki (10) Patent No.: US 7,966,114 B2
(45) Date of Patent: Jun. 21, 2011

(54) ELECTRIC POWER STEERING DEVICE, AND CONTROL METHOD THEREOF

(75) Inventor: Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 980 days.

(21) Appl. No.: 11/838,446

(22) Filed: Aug. 14, 2007

(65) Prior Publication Data

US 2008/0047775 A1    Feb. 28, 2008

(30) Foreign Application Priority Data

Aug. 28, 2006   (JP) ................................ 2006-230294

(51) Int. Cl.
*B62D 5/04*    (2006.01)
*B62D 6/08*    (2006.01)

(52) U.S. Cl. .......................... 701/41; 180/443

(58) Field of Classification Search .............. 701/41; 73/117.02; 180/6.2, 6.44, 6.48, 6.5, 443, 180/446, 6.28; 475/18–19
See application file for complete search history.

(56) References Cited

U.S. PATENT DOCUMENTS

| | | | |
|---|---|---|---|
| 4,989,682 A | | 2/1991 | Takahashi et al. |
| 6,152,254 A | * | 11/2000 | Phillips .................. 180/422 |
| 7,694,777 B2 | * | 4/2010 | Yamashita et al. ........... 180/443 |
| 7,860,624 B2 | * | 12/2010 | Kubota et al. .................. 701/41 |
| 2008/0035411 A1 | * | 2/2008 | Yamashita et al. ........... 180/443 |

FOREIGN PATENT DOCUMENTS

| | | |
|---|---|---|
| DE | 39 11 088 C2 | 10/1989 |
| JP | 7-156817 | 6/1995 |
| JP | 11-78938 | 3/1999 |
| JP | 2002-87309 | 3/2002 |
| JP | 2002-120744 | 4/2002 |
| JP | 2002-249063 | 9/2002 |
| JP | 2003-276634 | 10/2003 |
| JP | 2004-42691 | 2/2004 |
| JP | 2004-106673 | 4/2004 |
| JP | 2006-137341 | 6/2006 |

\* cited by examiner

*Primary Examiner* — Yonel Beaulieu (74) *Attorney, Agent, or Firm* — Oblon, Spivak, McClelland, Maier & Neustadt, L.L.P.

(57) ABSTRACT

A first compensation torque T1, a second compensation torque T2 and a third compensation torque T3 are added to a basic assist torque Tas. In this case, the second compensation torque T2 and the third compensation torque T3 are corrected by multiplying them by a common control gain G that is determined by the steering torque Th and the vehicle speed v. Therefore, since the two compensation control amounts are corrected through multiplication by the common control gain G, no interference occurs between the compensation controls. Besides, when the direction in which the total (T2+T3) of the pre-correction second compensation torque T2 and the pre-correction third compensation torque T3 acts is the same direction as the steering torque Th, the multiplication by the control gain G is avoided.

7 Claims, 9 Drawing Sheets

ELECTRIC POWER STEERING DEVICE, AND CONTROL METHOD THEREOF

INCORPORATION BY REFERENCE

The disclosure of Japanese Patent Application No. 2006-230294 filed on Aug. 28, 2006, including the specification, drawings and abstract is incorporated herein by reference in its entirety.

BACKGROUND OF THE INVENTION

1. Field of Invention

The invention relates to an electric power steering device, and a control method thereof. More particularly, the invention relates to an electric power steering device equipped with an electric actuator for assisting the driver's steering operation of a steering wheel, and a control method of the device.

2. Description of Related Art

A known electric power steering device of a vehicle detects the steering torque given to the steering wheel, and causes an electric motor to generate a steering assist torque in accordance with the detected steering torque. The thus-generated steering assist torque is controlled by a controller. The controller, for example, calculates a basic assist control amount (e.g., a basic assist torque) on the basis of the steering torque detected by the steering torque sensor, and the vehicle speed detected by a vehicle speed sensor. Furthermore, the controller calculates a compensation control amount (e.g., a compensation torque) for compensating for the basic assist control amount, and adds the compensation control amount to the basic assist control amount to calculate a final target assist control amount. Then, on the basis of the calculated target assist control amount, the controller controls the electrification of the electric motor so that a desired steering assist torque is generated. Such a compensation control amount is calculated in various techniques in accordance with the individual purposes.

For example, an electric power steering device proposed in Japanese Patent Application Publication No. JP-A-7-156817 calculates a compensation control amount in accordance with the steering rotation speed in order to acquire a steering assist torque that corresponds to a sharp steering operation, such as a hazard-avoiding emergency steering or the like, while quickening the convergence of the vehicle behavior. In calculating the compensation control amount, the device of Japanese Patent Application Publication No. JP-A-7-156817 multiplies the compensation control amount by a damping coefficient that changes in accordance with the steering torque.

An electric power steering device proposed in Japanese Patent Application Publication No. JP-A-2004-42691 determines a basic damping compensation electric current value in accordance with the steering speed and the vehicle speed, and calculates a damping compensation value from the multiplication product of the basic damping compensation current value and a damping compensation current gain, in order to improve the steering feeling while performing a converging control. In this case, the damping compensation current gain can be switched in accordance with the steering condition.

Furthermore, an electric power steering device proposed in Japanese Patent Application Publication No. JP-A-2002-87309 adopts a construction in which a damping control amount calculated by multiplying the motor rotation speed by a damping control gain Kd, and a steering angular speed feedback control amount calculated by multiplying a control amount calculated on the basis of a deviation of the actual motor rotation speed from a target motor rotation speed computed from the steering torque, by a control gain Go (s), are used as compensation control amounts, in order to improve the follow-up cartelistic regarding the steering wheel operation and the converging characteristic. In this case, the damping control gain Kd is a variable determined by the vehicle speed, the steering torque and the motor rotation speed. Besides, the control gain Go (s) is a variable determined by any one or more of the vehicle speed, the road surface friction coefficient, the road wheel steering angle, and the road wheel steering angular speed.

In the above-described electric power steering devices, the compensation control amount is calculated in accordance with their respective purposes. However, if two or more of the compensation controls as mentioned above are combined, the compensation controls may sometimes interfere with each other, and there is a possibility of failure in achieving a desired steering feeling.

The compensation control amount, which is calculated on the basis of the steering state quantity or the vehicle state quantity, is corrected by multiplying it by a unique control gain that is set for each compensation control. The control gain is determined taking into account events or the like, such as other steering states or other vehicle states. Therefore, in the case where a plurality of compensation controls of different purposes are combined, the individual compensation controls may interfere with one another, the conformation thereof is very difficult. Hence, at the time of development, it is necessary to check the mutual influences of a plurality of compensation controls, which causes increases in the amount of man-hours (the man-hours for the conformation).

SUMMARY OF THE INVENTION

It is an object of the invention to provide an electric power steering device capable of improving the steering feeling by favorably combining a plurality of compensation controls so that interference therebetween does not occur.

A first aspect of the invention relates to an electric power steering device that generates steering assist torque by driving an electric actuator in accordance with steering operation of a steering wheel. This electric power steering device includes: a torque information acquisition portion that acquires steering torque information regarding the steering torque input through the steering operation of the steering wheel; an other information acquisition portion that acquires steering state information regarding a steering state other than the steering torque information, or vehicle state information regarding a vehicle state; a basic assist control amount calculation portion that calculates a basic assist control amount based on at least information acquired from the torque information acquisition portion; a plurality of compensation control amount calculation portions that calculate compensation control amounts for compensating for the basic assist control amount based on information acquired from the other information acquisition portion; a target assist control amount calculation portion that calculates a target assist control amount by uniting the basic assist control amount calculated by the basic assist control amount calculation portion, and the compensation control amounts respectively calculated by the plurality of compensation control amount calculation portions; an actuator control portion that drives and controls the electric actuator based on the target assist control amount calculated by the target assist control amount calculation portion; and a compensation control amount correction portion that corrects the compensation control amounts by multiplying the compensation control amounts calculated by at least two or more compensation control amount calculation portions of the plurality of compensation control amount calculation portions, by a common control gain that changes in accordance with the steering torque information, or by summing the compensation control amounts calculated by at least two or more compensation torque control amount calculation portions of the plurality of compensation control amount calculation portions, and multiplying the summed compensation control amount by a control gain that changes in accordance with the steering torque information.

According to this electric power steering device, the target assist control amount calculation portion calculates a target assist control amount by uniting the basic assist control amount calculated by the basic assist control amount calculation portion, and the compensation control amounts calculated respectively by the plurality of compensation control amount calculation portions. The actuator control portion drives and controls the electric actuator on the basis of the calculated target assist control amount. In this case, the compensation control amount correction portion corrects the compensation control amount not by multiplying compensation control amounts calculated by at least two or more compensation control amount calculation portions by individually set control gains, but by multiplying them by a common control gain that changes in accordance with the steering torque information. Or, the compensation control amount correction portion corrects the compensation control amount by summing the compensation control amounts calculated by at least two or more compensation control amount calculation portions, and by multiplying the summed compensation control amount by a control gain that changes in accordance with the steering torque information.

Therefore, since at least two compensation control amounts are multiplied by a common control gain that changes in accordance with the steering torque information, the compensation control amount can be corrected in accordance with the steering state without causing interference between the compensation controls. As a result, the conformation of a plurality of compensation controls of different purposes becomes easy, and the man-hours for the conformation can be reduced. Besides, since the interference between the compensation controls is prevented and a proper target assist control amount is calculated, good steering feeling can be obtained.

In this electric power steering device, the control gain may be further corrected in accordance with the steering state information other than the steering torque information, or the vehicle state information.

According to this electric power steering device, the common control gain by which a plurality of compensation control amounts are multiplied is further corrected in accordance with the steering state information other than the steering torque information, or the vehicle state information. Therefore, the common control gain used by the compensation control amount correction portion becomes further appropriate. As a result, since the compensation control amount correction portion corrects the compensation control amount by using the common control gain that changes in accordance with a plurality of pieces of information, the compensation control amount can be further appropriately corrected without interference between the compensation controls.

In this electric power steering device, the control gain may be a variable equal to or greater than 0 and less than or equal to 1 which decreases as a magnitude of the steering torque in the steering torque information increases, and the compensation control amount correction portion may correct the compensation control amount by multiplying the compensation control amount by the control gain if a control amount obtained by summing the compensation control amounts prior to being multiplied by the control gain acts in a direction opposite to the direction of the steering torque, and the compensation control amount correction portion may avoid correcting the compensation control amount by the multiplication by the control gain if the control amount obtained by uniting the compensation control amounts prior to being multiplied by the control gain acts in the same direction as the steering torque.

According to this electric power steering device, since the control gain is a variable equal to or greater than 0 and less than or equal to 1, the multiplication by the control gain acts in such a direction as to decrease the magnitude (absolute value) of the compensation control amount. Besides, the control gain is set so as to decrease as the magnitude (absolute value) of the steering torque increases. Therefore, if a driver operates the steering wheel with a great operating force, the compensation control amount is corrected to a small value.

Depending on the situation, the compensation control acts in the same rotation direction (assistance direction) as the steering torque in some cases, and acts in the direction opposite to the rotation speed of the steering torque in other cases. Then, the compensation control amount correction portion avoids performing the multiplication by the control gain if the control amount obtained by summing the compensation control amounts prior to being multiplied by the control gain, that is, the summed amount of the compensation control amounts calculated by the at least two or more compensation control amount calculation portions that are to be multiplied by the control gain, acts in the same direction as the steering torque. Therefore, the compensation control torque that acts in the steering assistance direction does not decrease, but an appropriate steering assist torque is obtained.

Furthermore, if the control amount obtained by summing the compensation control amounts prior to being multiplied by the control gain acts in the direction opposite to the direction of the steering torque, the compensation control amount correction portion performs the multiplication by the control gain to correct the compensation control amount to so as to lessen the compensation control amount as the magnitude of the steering torque is greater. Therefore, if the steering torque is great as in the case where the driver intentionally steers, the compensation control amount contradicting with the steering operation is sufficiently reduced so that the steering operation is not hindered. Besides, in the case where the driver's steering intention is little and the steering torque is small, the compensation control appropriately operates so that a desired torque compensation can be performed.

Furthermore, this electric power steering device may further include an abnormality detection portion that detects an abnormality of the torque information acquisition portion, and a torque information switching portion that switches to steering torque information obtained by setting at zero a magnitude of the steering torque that acts on the steering wheel, when an abnormality of the torque information acquisition portion is detected by the abnormality detection portion.

Furthermore, in this electric power steering device, the steering state information may be a steering angle of the steering wheel, or a steering angular speed of the steering wheel.

In this electric power steering device, the vehicle state information may be a lane deviation degree calculated based on a positional relationship between a vehicle and a road center line.

According to the electric power steering device, when an abnormality of the torque information acquisition portion is detected by the abnormality detection portion, the torque information switching portion switches to the steering torque information obtained by setting the magnitude of the steering torque at zero. Therefore, the operation of the electric power steering device can be continued so as to apply the compensation torque caused only by the compensation control to the steering wheel. Specifically, while the basic assist control amount is kept at zero by setting the magnitude of the steering torque at zero, a target assist control amount can be found from the compensation control amount calculated on the basis of the steering state information other than the steering torque information, or the vehicle state information, and then the electric actuator can be driven and controlled on the basis of the target assist control amount. Therefore, even in the case where an abnormality of the torque information acquisition portion is detected, the function of the electric power steering device is not completely stopped, but the assist torque by the compensation control can still be provided.

A second aspect of the invention relates to a control method of an electric power steering device. More concretely, the second aspect relates to a control method of an electric power steering device that generates steering assist torque by driving an electric actuator in accordance with steering operation of a steering wheel. The control method of the electric power steering device includes the step of acquiring steering torque information regarding the steering torque input through the steering operation of the steering wheel, the step of acquiring steering state information regarding a steering state other than the steering torque information, or vehicle state information regarding a vehicle state, the step of calculating a basic assist control amount based on at least the steering torque information, the step of calculating a plurality of compensation control amounts for compensating for the basic assist control amount based on the steering state information or the vehicle state information; the step of calculating a target assist control amount by uniting the basic assist control amount and the plurality of compensation control amounts; the step of driving and controlling the electric actuator based on the target assist control amount; and the step of correcting the compensation control amounts by multiplying the plurality of compensation control amounts by a common control gain that changes in accordance with the steering torque information, or by summing the plurality of compensation control amounts, and multiplying the summed compensation control amount by the control gain.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
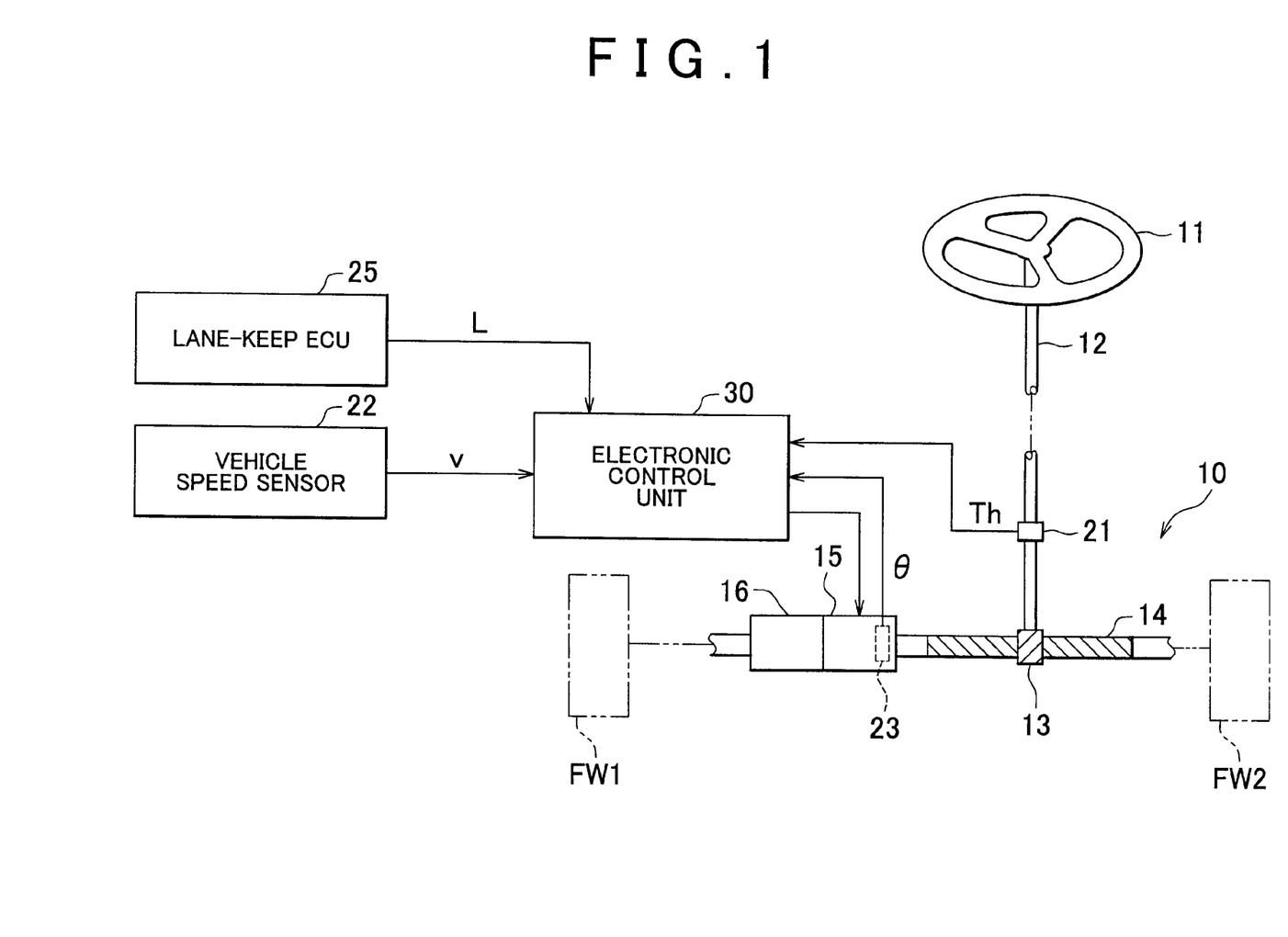
FIG. 1 is a schematic diagram of an electric power steering device of a vehicle in accordance with an embodiment of the invention.

Embodiments of the invention will be described hereinafter with reference to the drawings. FIG. 1 is a schematic diagram showing an electric power steering device of a vehicle in accordance with an embodiment of the invention.

This electric power steering device of the vehicle is, roughly, constructed of a road wheel steering mechanism 10 that steers steering road wheels in accordance with the turning or operation of a steering wheel, an electric motor 15 assembled to the road wheel steering mechanism 10 so as to generate steering assist torque, and an electronic control unit 30 that controls the operation of the electric motor 15 in accordance with the steered state of the steering wheel.

The road wheel steering mechanism 10 is a mechanism for steering left and right front wheels FW1, FW2 in accordance with the rotating operation of the steering wheel 11, and includes a steering shaft 12 whose upper end is connected to the steering wheel 11 so as to rotate integrally with the steering wheel 11. A pinion gear 13 is connected to a lower end of the steering shaft 12 so as to rotate together with the shaft 12. The pinion gear 13 meshes with rack teeth formed on a rack bar 14, thus making up a rack-and-pinion mechanism. The left and right front wheels FW1, FW2 are steerably connected to two opposite ends of the rack bar 14, via tie rods and knuckle arms. The left front wheel FW1 and the right front wheel FW2 are steered in the clockwise direction or in the counterclockwise direction in accordance with the movement of the rack bar 14 in its axial direction, which is caused due to the rotation of the steering shaft 12 about its axis. Therefore, the road wheel steering mechanism 10 is constructed of the steering wheel 11, the steering shaft 12, the rack-and-pinion mechanism 13, 14, the tie rods, the knuckle arms, etc.

The electric motor 15 for steering assistance is mounted to the rack bar 14. The electric motor 15 can be regarded as an electric actuator in the invention. The electric motor 15, in this embodiment, is a brushless motor that is a permanent magnet three-phase motor. A rotating shaft of the electric motor 15 is connected to the rack bar 14 via a ball-screw mechanism 16 so that power can be transferred. Through the rotation of the rotating shaft, the electric motor 15 assists the steering of the left and right front wheels FW1, FW2. The ball-screw mechanism 16 functions as a speed reducer and a rotation-to-linear motion converter; specifically, the mechanism 16 reduces the speed of the rotation of the electric motor 15, and converts the rotation into a linear motion, and transfers it to the rack bar 14. Instead of mounting the electric motor 15 to the rack bar 14, the electric motor 15 may be mounted to the steering shaft 12 so that the rotation of the electric motor 15 is transferred to the steering shaft 12 via a speed reducer, and thus drives the steering shaft 12 around its axis.

The steering shaft 12 is provided with a steering torque sensor 21. The steering torque sensor 21 outputs a signal in accordance with the steering torque that is input to act on the steering shaft 12 by the pivoting operation of the steering wheel 11. The value of steering torque detected by the signal output by the steering torque sensor 21 will hereinafter be termed steering torque Th. As for the steering torque Th, the operating direction of the steering wheel 11 is recognized on the basis of the sign of the value of the steering torque Th, that is, whether the value is negative or positive. steering wheel-steering wheel According to the embodiment of the invention, the steering torque Th takes a positive value when the driver's steering wheel 11 is turned clockwise. Conversely, the steering torque Th takes a negative value when the driver's steering wheel 11 is turned counterclockwise. The steering torque Th can be regarded as steering torque information in the invention. Besides, the steering torque sensor 21 can be regarded as a steering torque information acquisition portion in the invention.

The steering torque sensor 21 is constructed of, for example, two sets of resolver sensors (not shown) that detect the twist angle of a torsion bar that is provided in an intermediate portion of the steering shaft 12. The resolver sensors are provided at two opposite ends of the torsion bar so that they respectively detect the rotation angles. Therefore, from the difference between the rotation angles detected by the two resolver sensors, the steering torque Th can be detected. Each resolver sensor includes a resolver rotor that rotates together with the torsion bar, and a resolver stator that is fixed to a vehicle body side so that the resolver faces the resolver rotor. The resolver rotor is provided with a primary winding that is an exciting coil, while the resolver stator is provided with a pair of secondary windings shifted in phase from each other by $\pi/2$ which are detection coils. When the primary winding is excited by a sine wave signal, the secondary windings output two kinds of induced voltage signals in accordance with the rotation angle.

Instead of mounting the steering torque sensor 21 to the steering shaft 12, the steering torque sensor 21 may be mounted to the rack bar 14 so that the steering torque Th is detected from the amount of distortion of the rack bar 14 in the direction of its axis.

The electric motor 15 is provided with a rotation angle sensor 23. This rotation angle sensor 23 is incorporated in the electric motor 15, and outputs a detection signal in accordance with the rotation angle position of a rotator of the electric motor 15. For example, the rotation angle sensor 23 is constructed of a resolver sensor as described above. The detection signal from the rotation angle sensor 23 is used to calculate the rotation angle and the rotation angular speed of the electric motor 15. The rotation angle of the electric motor 15, which is proportional to the steering angle of the steering wheel 11, is also used as the steering angle of the steering wheel 11. The rotation angular speed of the electric motor 15, which is proportional to the steering angular speed of the steering wheel 11, is also used as the steering angular speed of the steering wheel 11.

Hereinafter, the value of the steering angle of the steering wheel 11 detected from the output signal of the rotation angle sensor 23 will be termed the steering angle $\theta$, and the value of the steering angular speed which is obtained by differentiating the steering angle $\theta$ with respect to time will be referred to as the steering angular speed $\omega$. The steering angle $\theta$ and the steering angular speed $\omega$ can be regarded as steering state information in the invention. Besides, the rotation angle sensor 23 can be regarded as other information acquisition portion in the invention. The steering angle $\theta$ represents the steering angle of the steering wheel 11 in the clockwise direction and the counterclockwise direction with respect to a neutral position of the steering wheel 11 on the basis of the positive and negative signs of the value of the steering angle $\theta$. In this embodiment, the neutral position of the steering wheel 11 is assumed to be "0", and the steering angle in the clockwise direction from the neutral position is shown by a positive value, and the steering angle in the counterclockwise direction from the neutral position is shown by a negative value.

Next, the electronic control unit 30 that controls the operation of the electric motor 15 will be described. The electronic control unit 30 includes, as a main component part, a microcomputer made up of a CPU, a ROM, a RAM, etc., and also includes a drive circuit for the electric motor 15. The electronic control unit 30 is connected with the steering torque sensor 21, the rotation angle sensor 23 and a vehicle speed sensor 22, and inputs detection signals from the sensors. The vehicle speed sensor 22 outputs a vehicle speed signal that represents the traveling speed v of the vehicle. The vehicle speed v detected by the vehicle speed sensor 22 can be regarded as vehicle state information in the invention. The vehicle speed sensor 22 can be regarded as an other information acquisition portion in the invention. Besides, the electronic control unit 30 is connected with the lane-keep control device 25 (hereinafter, referred to as "lane-keep ECU 25"), and inputs therefrom a lane-keep control signal that represents the lane deviation degree L of the vehicle.

The lane-keep ECU 25 is provided with a picture taking camera (not shown) (e.g., a stereo camera) and an image processing device and the like, and detects the left and right lane marker lines ahead of the vehicle to grasp the situation on the lane ahead and the state of the vehicle on the lane. For example, from the left and right lane marker lines, a virtual road center line is calculated as a target traveling line, and then the radius of curvature of the road center line, the lateral displacement amount that is the amount of lateral deviation of the position of the gravity center of the vehicle relative to the road center line, and the vehicle posture angle that is the angle formed between the direction of the vehicle and the direction of formation of the road center line are found. Then, a steering angle correction amount for causing the vehicle to travel along the road center line from the present position of the vehicle is calculated from a vehicle state equation that includes parameters, such as the vehicle speed, the yaw rate, etc.

The lane-keep ECU 25 outputs the lane-keep control signal that represents the lane deviation degree L proportional to the steering angle correction amount. As for the lane deviation degree L, a positive value is set when the steering angle needs to be corrected in the clockwise direction, and a negative value is set when the steering angle needs to be corrected in the counterclockwise direction. This lane deviation degree L obtained from the lane-keep ECU 25 can be regarded as vehicle state information in the invention. Besides, the lane-keep ECU 25 can be regarded as an other information acquisition portion in the invention. As for the lane-keep technology for vehicles, various techniques are known, and an arbitrary technique can be adopted in this embodiment. For example, in order to lighten the computation load, a value proportional to the lateral displacement amount or the vehicle posture angle may be found as the lane deviation degree L.

Figure 2:
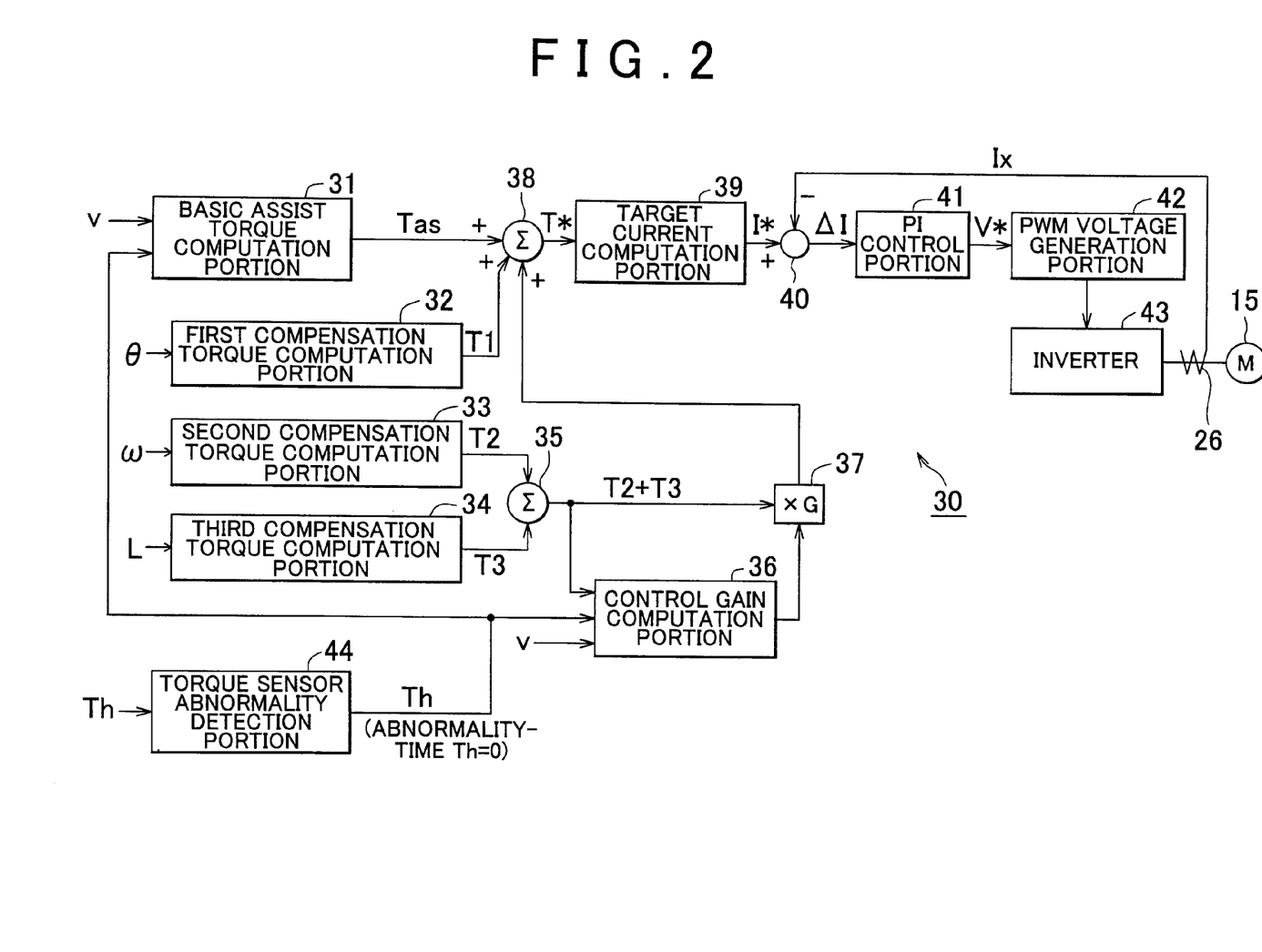
FIG. 2 is a functional block diagram showing functions of an electronic control unit in accordance with the embodiment.

Next, the electronic control unit 30 will be described in detail. FIG. 2 is an overall block diagram of the electronic control unit 30 including functional blocks that represent functions of the microcomputer realized by executing programs. The electronic control unit 30 includes a basic assist torque computation portion 31 that computes a basic assist torque as a basic assist control amount, and a first compensation torque computation portion 32, a second compensation torque computation portion 33, and a third compensation torque computation portion 34 that compute compensation torques as three compensation control amounts.

Figure 4:
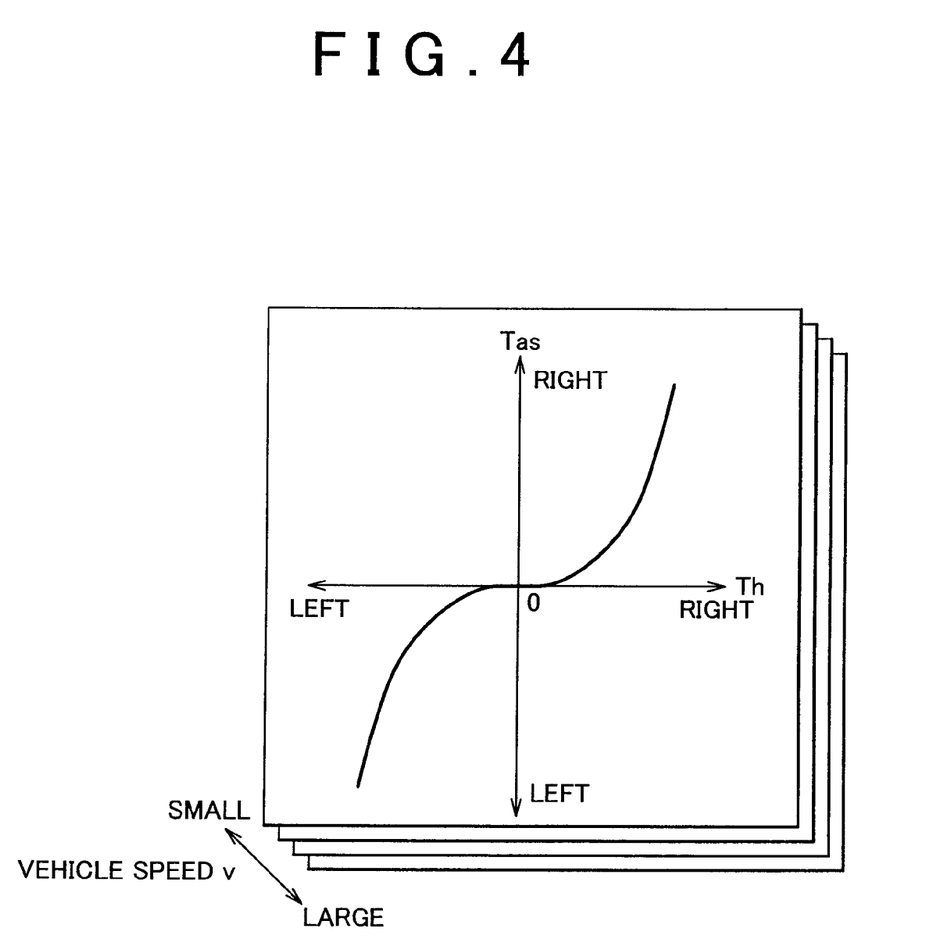
FIG. 4 is an illustration representing a basic assist map for calculating a basic assist torque.
Figure 5:
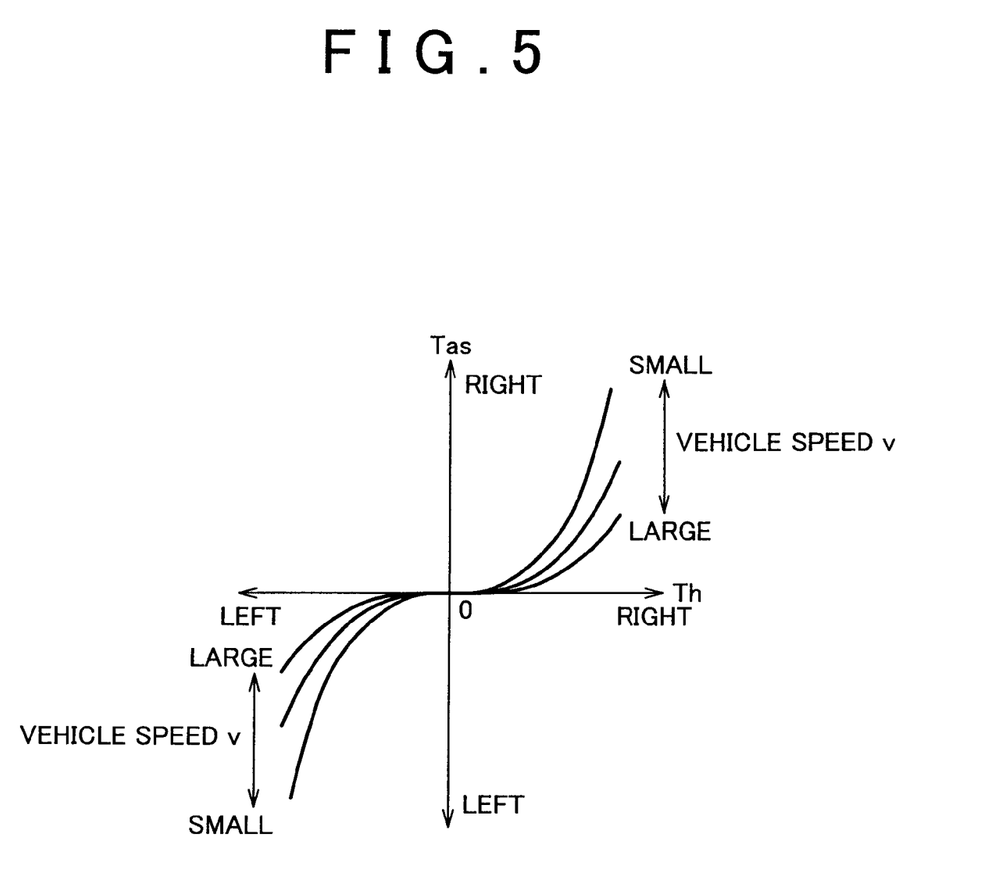
FIG. 5 is a characteristic graph showing a relationship between the steering torque and the basic assist torque in accordance with the vehicle speed.

The basic assist torque computation portion 31 inputs the steering torque Th and the vehicle speed v, and computes a basic assist torque Tas with reference to a basic assist map shown in FIG. 4. This basic assist map is a map in which the basic assist torque Tas in accordance with the steering torque Th is set separately for individual representative vehicle speeds v, and is stored in the basic assist torque computation portion 31. The basic assist torque Tas is set so as to increase with increase in the steering torque Th. Besides, a relationship of the basic assist torque Tas to the steering torque Th is set, as shown in FIG. 5, in such a manner that as the vehicle speed v is greater, the basic assist torque Tas assumes smaller values as a whole. Although in this embodiment, the basic assist torque Tas calculated through the use of the basic assist map, it is also permissible to prepare a function that defines the basic assist torque Tas that changes in accordance with the vehicle speed v and the steering torque Th, instead of the basic assist map, and to use the function to calculate the basic assist torque Tas.

Figure 6:
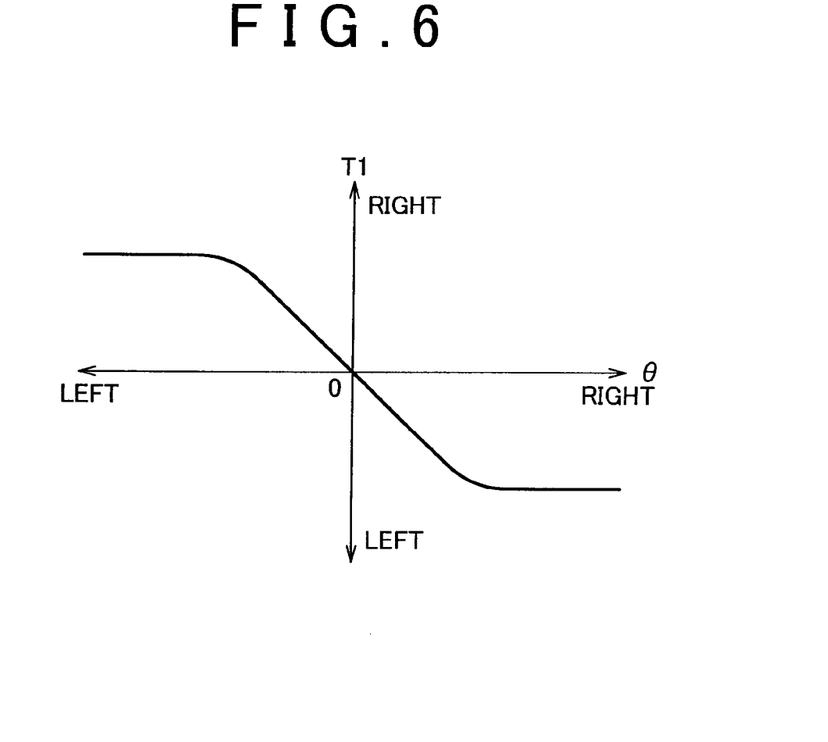
FIG. 6 is an illustration representing a first compensation torque map for calculating a first compensation torque.

The first compensation torque computation portion 32 inputs a rotation angle signal output by the rotation angle sensor 23 as a signal that represents the steering angle θ of the steering wheel 11, and calculates a first compensation torque T1 with reference to a first compensation torque map shown in FIG. 6. This first compensation torque map is a map in which the first compensation torque T1 in accordance with the steering angle θ is set, and is stored in the first compensation torque computation portion 32. The first compensation torque T1 is for causing a return torque that causes the steering wheel 11 to return to the neutral position, and is set at a value that is greater the greater the magnitude (absolute value) of the steering angle θ. Besides, with regard to the first compensation torque T1, an upper limit value is set. In a range in which the magnitude of the steering angle θ is larger than a predetermined angle, the first compensation torque T1 is restricted to a constant value. Incidentally, in this specification, when the magnitude of a value having a directional characteristic is discussed, the magnitude of the absolute value thereof is discussed.

Figure 7:
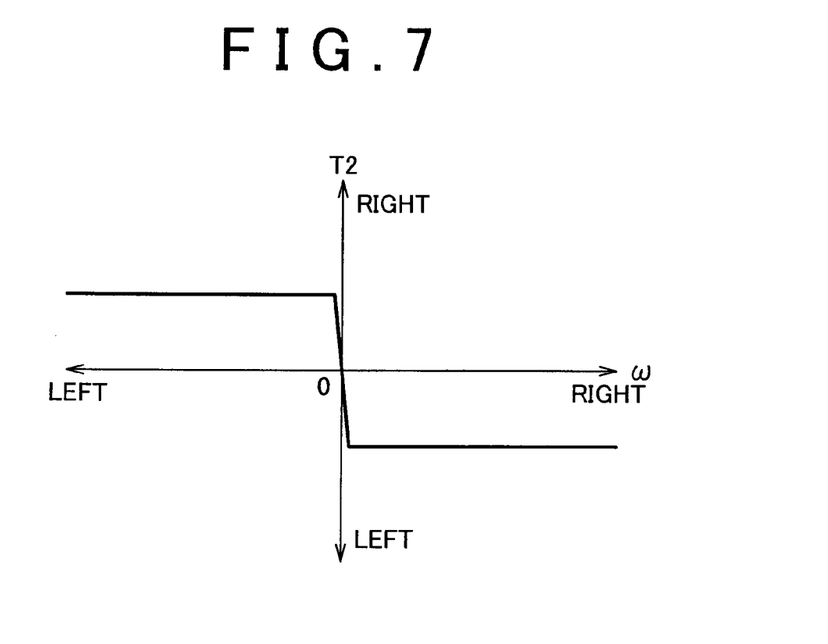
FIG. 7 is an illustration representing a second compensation torque map for calculating a second compensation torque.

The second compensation torque computation portion 33 inputs a signal that represents the steering angular speed ω of the steering wheel 11 that is calculated by differentiating the steering angle θ with respect to time, and calculates a second compensation torque T2 with reference to a second compensation torque map shown in FIG. 7. This second compensation torque map is a map in which the second compensation torque T2 in accordance with the steering angular speed ω is set, and is stored in the second compensation torque computation portion 33. This second compensation torque T2 is for giving an appropriate friction feel to the steering wheel 11, and is set at a constant value that acts in a direction opposite to the steering direction of the steering wheel 11. Incidentally, although a computation portion that computes the steering angular speed ω to by differentiating the steering angle θ with respect to time is not shown in the drawings, it suffices that the computation portion be provided in the second compensation torque computation portion 33.

Figure 8:
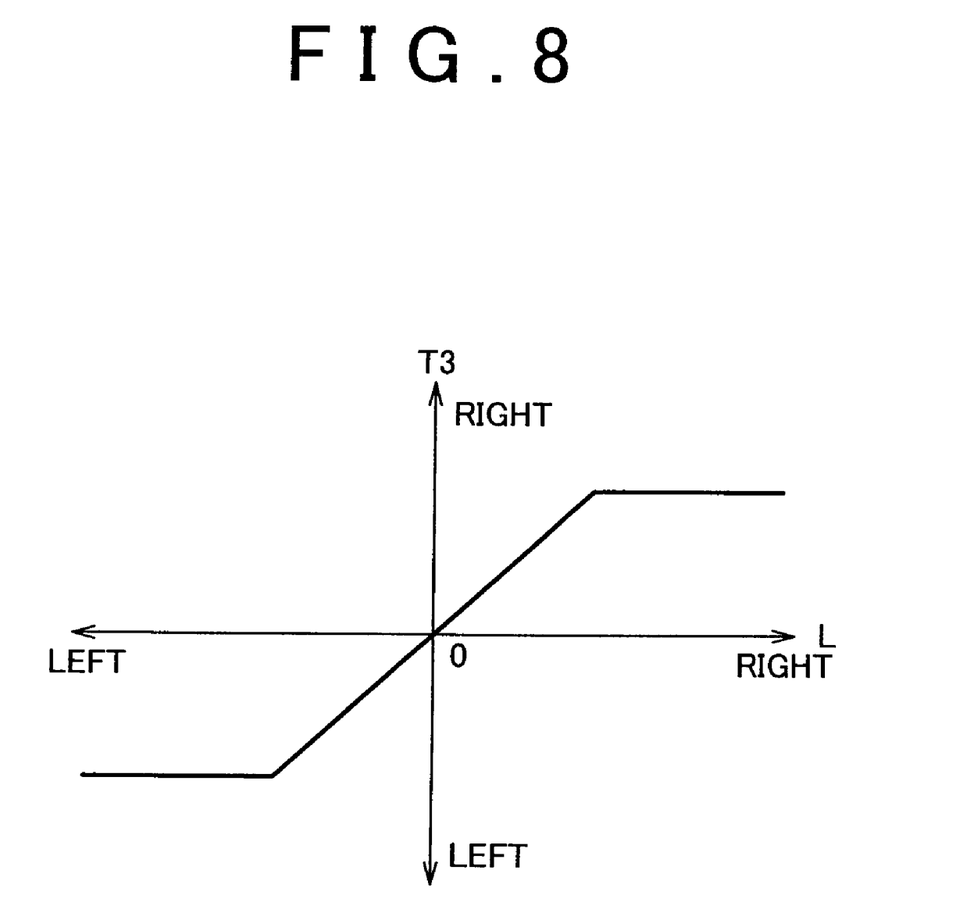
FIG. 8 is an illustration representing a third compensation torque map for calculating a third compensation torque.

The third compensation torque computation portion 34 inputs the lane-keep signal representing the lane deviation degree L that is output by the lane-keep ECU 25, and calculates a third compensation torque T3 with reference to a third compensation torque map shown in FIG. 8. This third compensation torque map is a map in which the third compensation torque T3 in accordance with the lane deviation degree L is set, and is stored in the third compensation torque computation portion 34. The third compensation torque T3 is for giving such a steering torque as to cause the vehicle to travel along the road center line when the state of travel of the vehicle (the traveling position, the traveling direction) deviates from the road center line. The third compensation torque T3 is set at a value that is greater the greater the value of the lane deviation degree L. Therefore, when a steering angle correction in the clockwise direction is needed, the third compensation torque T3 is set at a magnitude in the clockwise direction that is in accordance with the amount of the steering angle correction. When a steering angle correction in the counterclockwise direction is needed, the third compensation torque T3 is set at a magnitude in the counterclockwise direction that is in accordance with the amount of the steering angle correction. With regard to the third compensation torque T3 as well, an upper limit value is set. If the magnitude of the lane deviation degree L is greater than or equal to a predetermined value, the third compensation torque T3 is restricted to a constant value.

The electronic control unit 30 further includes a compensation torque addition computation portion 35, a control gain computation portion 36, and a gain multiplication portion 37. The compensation torque addition computation portion 35 adds the second compensation torque T2 calculated by the second compensation torque computation portion 33 to the third compensation torque T3 calculated by the third compensation torque computation portion 34, and outputs the addition result (T2+T3) to the control gain computation portion 36 and the gain multiplication portion 37.

The control gain computation portion 36 inputs the addition result (T2+T3) output by the compensation torque addition computation portion 35, and determines whether the direction of torque shown by the summed value (T2+T3) is the same as or opposite to the direction of the steering torque Th detected by the steering torque sensor 21. Then, the control gain computation portion 36 calculates a control gain G that corrects the magnitude of the compensation control on the basis of the steering torque Th and the vehicle speed v.

Figure 9:
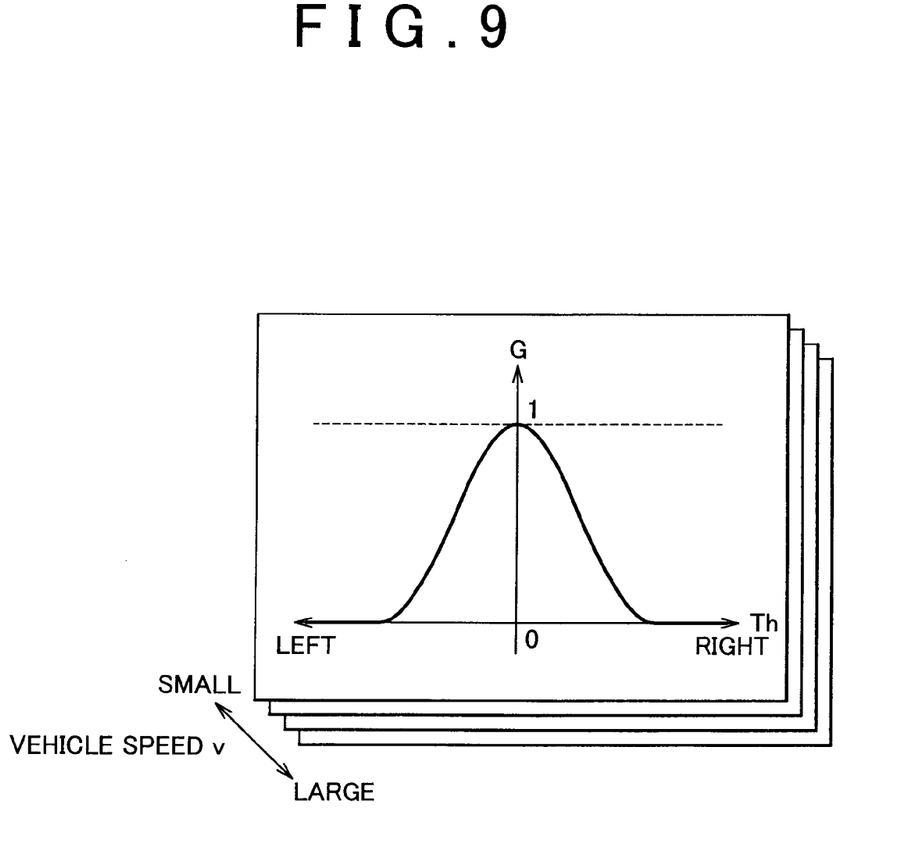
FIG. 9 is an illustration representing a torque gain map for calculating a control gain G.

The control gain G is calculated with reference to a torque gain map shown in FIG. 9. The torque gain map is a map in which the control gain G in accordance with the steering torque Th is set separately for individual representative vehicle speeds v, and is stored in the control gain computation portion 36. The control gain G decreases as the steering torque Th increases in either of the counterclockwise and clockwise directions. If the steering torque Th is greater than or equal to a predetermined value, the control gain G is set at value "0". Besides, the relationship of the control gain G to the steering torque Th is set so that as the vehicle speed v is smaller, the control gain G assumes smaller values as a whole. Besides, the control gain G is set at value "1" when the magnitude of the steering torque Th is 0 Nm (newton meter) in a highest speed range. Although in the embodiment, the control gain G is calculated through the use of the torque gain map, it is also permissible to prepare a function that defines the control gain G that changes in accordance with the steering torque Th and the vehicle speed v instead of the torque gain map, and to use the function to calculate the control gain G.

When the direction of torque shown by the summed value (T2+T3) output by the compensation torque addition computation portion 35 is the same as the direction of the steering torque Th detected by the steering torque sensor 21, the control gain computation portion 36 does not perform the calculation of the control gain G based on the torque gain map, but sets the value of the control gain G at 1 (G=1).

The control gain computation portion 36 outputs the set control gain G to the gain multiplication portion 37. The gain multiplication portion 37 corrects the value of the compensation control torque by multiplying the summed value (T2+T3) of the second compensation torque T2 and the third compensation torque T3 which is output by the compensation torque addition computation portion 35, by the control gain G output by the control gain computation portion 36. However, in the case where the direction of torque shown by the summed value (T2+T3) output by the compensation torque addition computation portion 35 is the same as the direction of the steering torque Th detected by the steering torque sensor 21, the correction of the compensation control torque is not performed since in that case the control gain G is set at 1 (G=1).

The electronic control unit 30 includes a target torque computation portion 38. This target torque computation portion 38 can be regarded as a target assist control amount calculation portion in the invention. The target torque computation portion 38 inputs the basic assist torque Tas calculated by the basic assist torque computation portion 31, the first compensation torque T1 calculated by the first compensation torque computation portion 32, and the corrected compensation torque ((T2+T3)·G) calculated by the gain multiplication portion 37, and then calculates the total value thereof. This total value becomes a target assist torque T*. Then, on the basis of the target assist torque T*, the electric motor 15 is driven and controlled by the functional portions mentioned below.

The electronic control unit 30 includes a target current computation portion 39, an electric current deviation computation portion 40, a proportional-plus-integral control portion (PI control portion) 41, a PWM voltage generation portion 42, and an inverter circuit 43. These functional portions can be regarded as actuator control portions in the invention. The target current computation portion 39 inputs the target assist torque T* calculated by the target torque computation portion 38, and calculates a target current I* that is proportional to the target assist torque T*. The electric current deviation computation portion 40 inputs the target current I* calculated by the target current computation portion 39 and an actual current Ix that flows through the electric motor 15, and calculates a deviation ΔI therebetween (=I*−Ix). A power source line of the electric motor 15 is provided with a current sensor 26. Therefore, the electric current deviation computation portion 40 calculates the actual current Ix by inputting a detection signal of the current sensor 26. The signal of the deviation ΔI calculated by the electric current deviation computation portion 40 is output to the proportional-plus-integral control portion (PI control portion) 41. The proportional-plus-integral control portion 41 calculates a target voltage V* on the basis of the deviation ΔI so that the actual current Ix follows the target current I*, that is, so that the deviation ΔI becomes zero.

The target voltage V* calculated by the proportional-plus-integral control portion 41 is output to the PWM voltage generation portion 42. The PWM voltage generation portion 42 outputs a three-phase PWM control voltage signal that corresponds to the target voltage V*, to the inverter circuit 43. The inverter circuit 43 generates a three-phase exciting voltage that corresponds to the PWM control voltage signal, and applies the exciting current to the electric motor 15 via a three-phase power source line. Therefore, the left and right front wheels FW1, FW2 are steered while the steering is being assisted by the driving force of the electric motor 15.

The electronic control unit 30 further includes a torque sensor abnormality detection portion 44 that detects an abnormality of the steering torque sensor 21. The torque sensor abnormality detection portion 44 inputs an output signal of the steering torque sensor 21, and determines the presence/absence of an abnormality of the steering torque sensor 21 from the input signal. In this embodiment, resolver sensors are used as the steering torque sensor 21. In the resolver sensor, a winding sometimes comes to have a break or an insulation failure. Therefore, the torque sensor abnormality detection portion 44 monitors the amplitude of the output signal of each resolver sensor, and determines the presence of a sensor abnormality if the amplitude deviates from a predetermined allowable range. Furthermore, the torque sensor abnormality detection portion 44 detects an abnormality by comparing the induced voltage signals from the pair of secondary windings of the resolver sensor. The presence of a sensor abnormality is also determined in the case where the combination of the states of the two detection signals is contradicted, for example, the case where when a sine wave signal is output from the one of the secondary windings, a constant value signal is output from the other secondary winding.

When an abnormality of the steering torque sensor 21 is not detected, the torque sensor abnormality detection portion 44 simply outputs a signal that represents the steering torque Th input from the steering torque sensor 21. On the other hand, if an abnormality of the steering torque sensor 21 is detected, the torque sensor abnormality detection portion 44 outputs a signal that represents that the value of the steering torque Th is zero (Th=0). The output signal of the torque sensor abnormality detection portion 44 is input as steering torque Th information to the basic assist torque computation portion 31 and the control gain computation portion 36. Therefore, the foregoing calculation process of the basic assist torque Tas by the basic assist torque computation portion 31 and the foregoing calculation process of the control gain G by the control gain computation portion 36 are based on the steering torque Th represented by the output signal of the torque sensor abnormality detection portion 44.

Figure 3:
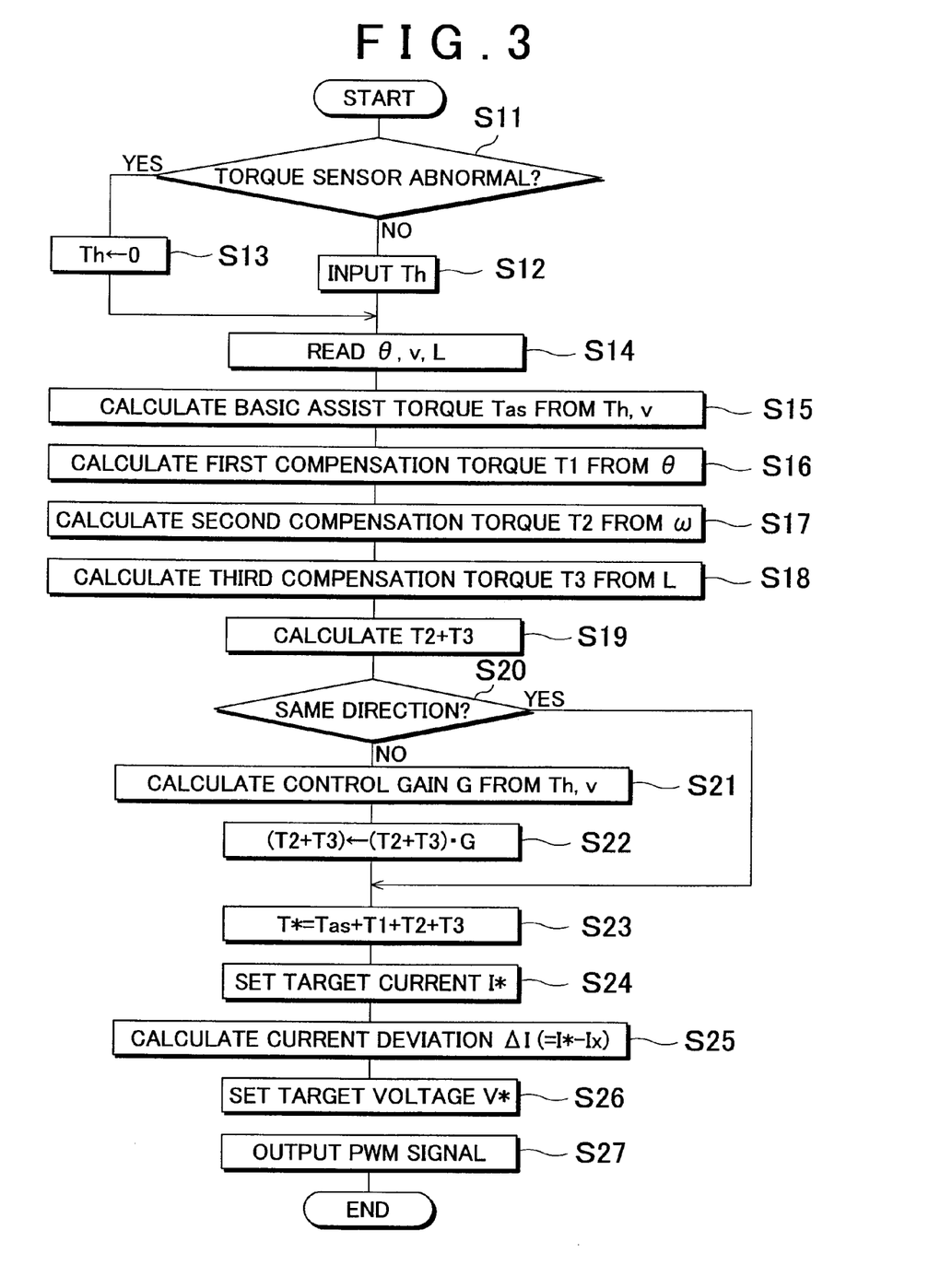
FIG. 3 is a flowchart representing an assist control routine.

Next, an overall process of the assist control performed by the electronic control unit 30 constructed as described above will be described with reference to a flowchart. FIG. 3 represents an assist control routine executed by the electronic control unit 30 which is stored as a control program in the ROM of the electronic control unit 30. This control routine is repeatedly executed with a predetermined short cycle while the ignition switch (not shown) is on.

When the control routine starts, the electronic control unit 30 firstly, in step S11, reads the output signal of the steering torque sensor 21, and determines from the output signal whether or not there is an abnormality occurring in the steering torque sensor 21. This process is performed by the torque sensor abnormality detection portion 44. If an abnormality is not detected (NO in S11), the output signal of the steering torque sensor 21 is input as information that represents the steering torque Th (S12). On the other hand, if an abnormality of the steering torque sensor 21 is detected, the value of the steering torque Th is set at zero (Th=0 N·m) (S13). Incidentally, the process of step S11 performed by the torque sensor abnormality detection portion 44 can be regarded as a abnormality detection portion in the invention. The process of steps S12 and S13 can be regarded as a torque information switching portion in the invention.

After the steering torque Th is input in this manner, the electronic control unit 30, in step S14, reads the steering angle θ, that is, information output by the rotation angle sensor 23, the vehicle speed v, that is, information output by the vehicle speed sensor 22, and the lane deviation degree L, that is, information output by the lane-keep ECU 25. Subsequently, the electronic control unit 30 calculates the basic assist torque Tas from the steering torque Th and the vehicle speed v by using the basic assist torque computation portion 31 (S15), and calculates the first compensation torque T1 from the steering angle θ by using the first compensation torque computation portion 32 (S16), and calculates the second compensation torque T2 from the steering angular speed ω by using the second compensation torque computation portion 33 (S17), and calculates the third compensation torque T3 from the lane deviation degree L by using the third compensation torque computation portion 34 (S18).

Subsequently in step S19, the electronic control unit 30 calculates the total value (T2+T3) of the second compensation torque T2 and the third compensation torque T3, and determines whether or not the rotation direction based on the total value (T2+T3) is the same as the rotation direction of the steering torque Th. The summed compensation torque acts in the clockwise rotation direction if the value (T2+T3) of the summed compensation torque is a positive value, and acts in the counterclockwise direction if the value (T2+T3) is a negative value. If a negative determination is made in step S20 (NO), that is, if the direction of the summed compensation torque is opposite to the direction of the steering torque Th, the electronic control unit 30 proceeds to steps S21 and S22.

In step S21, the electronic control unit 30 calculates the control gain G from the steering torque Th, and the vehicle speed v from the torque gain map. Subsequently in step S22, the electronic control unit 30 multiplies the total value (T2+T3) of the second compensation torque T2 and the third compensation torque T3 by the control gain G, and sets the value ((T2+T3)·G) corrected by multiplication by the control gain G as a new compensation torque (T2+T3). If an affirmative determination is made in step S20 (YES), that is, if the direction of the summed compensation torque is the same as the direction of the steering torque Th, the electronic control unit 30 skips the process of steps S21 and S22. The process of steps S19, S20, S21 and S22 is a process that is performed by the compensation torque addition computation portion 35, the control gain computation portion 36 and the gain multiplication portion 37.

After the correction of the second compensation torque T2 and the third compensation torque T3 by the common control gain G is completed as described above, the electronic control unit 30, in step S23, calculates a target assist torque T* by adding the basic assist torque Tas, the first compensation torque T1, and the second and third compensation torques T2, T3 corrected by the control gain G (T*=Tas+T1+T2+T3). The process of step S23 is performed by the target torque computation portion 38.

Subsequently in step S24, the electronic control unit 30 sets a target current I* from the target assist torque T*. In step S25, the electronic control unit 30 detects the actual current Ix that flows through the electric motor 15, and calculates a deviation ΔI of the actual current Ix from the target current I* (ΔI=(I*−Ix)). In step S26, the electronic control unit 30 sets a target voltage V* to be applied to the electric motor 15, from the deviation ΔI (=I*−Ix). After the target voltage V* is set, the electronic control unit 30 generates three-phase PWM control voltage signals UU, VU, WV that correspond to the target voltage V*, and outputs the signals to the inverter circuit 43.

The process of step S24 is a process performed by the target current computation portion 39. The process of step S25 is a process performed by the electric current deviation computation portion 40. The process of step S26 is a process performed by the proportional-plus-integral control portion (PI control portion) 41. The process of step S27 is a process executed by the PWM voltage generation portion 42. This assist control routine is repeatedly executed with a predetermined short cycle. Therefore, the electric motor 15 is driven and controlled so that the road wheel steering mechanism 10 is always given an assist torque that is in accordance with the steering torque Th, the vehicle speed v, the steering angle θ, the steering angular speed ω, and the lane deviation degree L.

According to the above-described electric power steering device of the embodiment, the electronic control unit 30 calculates the basic assist torque Tas from the steering torque Th and the vehicle speed v, and calculates the three compensation torques T1 to T3 for compensating for the basic assist torque Tas, and finds a target assist torque T* by summing the torques. The compensation torques are the first compensation torque T1 for causing a return torque that urges the steering wheel 11 to return to the neutral position, the second compensation torque T2 for giving an appropriate friction feel to the steering wheel 11, and the third compensation torque T3 in accordance with the lane deviation degree L which gives such an assistance that the vehicle will follow the lane center.

The electronic control unit 30 multiplies the second compensation torque T2 and the third compensation torque T3 by the common control gain G in order to correct the second and third compensation torques in accordance with the steering torque Th and the vehicle speed v. In this embodiment, the total value (T2+T3) of the second compensation torque T2 and the third compensation torque T3 is multiplied by the control gain G. This control gain G is a variable that is set by the steering torque Th and the vehicle speed v and that assumes a value ranging from 0 to 1, and acts so as to decrease the compensation torque. Then, only when the total value (T2+T3) of the two compensation torques acts in the direction opposite to the direction of the steering performed by the driver (the steering torque direction), the electronic control unit 30 performs correction by multiplying the compensation torques T2, T3 by the control gain G so as to decrease the compensation torque.

In a situation where the steering torque is great, as in a situation where the driver intentionally steers, the value of the control gain G is set at "0" or at a small value close to "0", so that the value of the corrected compensation torque (T2+T3) is very small and a compensation torque contradicting with the intention of the driver is not generated. In this embodiment, as for the second compensation torque T2 that gives a friction feel to the steering wheel 11 and the third compensation torque T3 that guides the vehicle so as to follow the lane center, when the steering wheel operation force exerted by the driver is great, the compensation torques T2, T3 are set at small values by reflecting the driver's intention. Therefore, these compensation torques T2, T3 do not hinder the steering wheel operation of the driver.

In a situation where the driver's steering intention is little and the steering torque is small, the value of the control gain G is set at value "1" or at a large value close to value "1", so that an appropriate compensation torque acts so that a good steering friction feel is obtained and the vehicle is guided in a direction that follows the lane.

In the case where the total value (T2+T3) of the two compensation torques acts in the direction that is the same as the driver's steering direction (the steering torque direction), that is, where the total value (T2+T3) is calculated as a torque in such a direction as to help the driver's steering operation, the electronic control unit 30 avoids the multiplication of the compensation torque T2, T3 by the control gain G and therefore does not correct the compensation torque. In this embodiment, the control gain G is set as G=1 in that case, so that substantial correction is not performed. Therefore, the compensation torque is not corrected to a small value, and the effect of the compensation control can be sufficiently obtained.

For example, in a situation where the driver is operating the steering wheel in the clockwise direction, the third compensation torque T3 is calculated as a steering assistance that acts in the clockwise direction, from the signal form the lane-keep ECU 25. Furthermore, if the value of the third compensation torque T3 is greater than the value of the second compensation torque T2, the direction of the total value (T2+T3) of the compensation torques becomes the same as the driver's steering direction. In such a situation, the electronic control unit 30 allows the compensation torques to act without further processing. That is, the compensation torque (T2+T3) is not decreased for correction by the control gain G. Therefore, the driver can be assisted by the compensation torque (T2+T3) in adjusting the direction of the vehicle to a proper direction without feeling discomfort or the like.

Furthermore, in the first compensation control of the three compensation controls, the multiplication by the control gain G is not performed, and the multiplication by the common control gain G in the other two compensation controls is performed. Therefore, even though three compensation controls are simultaneously performed, no interference occurs among the compensation controls. For example, let assumed a control system in which control gains are set separately for each of the compensation controls, and the control gains uniquely change depending on the steering information or the vehicle information. In this control system, since the compensation controls calculate the compensation control amounts independently of one another, a combination of the compensation controls sometimes suffers from interference therebetween, resulting in failure to obtain good steering feeling.

According to the embodiment, however, the compensation control amounts are corrected by using a common control gain G, so that the compensation controls do not interfere with one another. Therefore, the conformation of the individual compensation controls is easy, and an increase in the man-hours for the conformation is not caused. Besides, good steering feeling is obtained. Furthermore, since the kinds of the control gains are reduced, the ROM capacity of the electronic control unit 30 can be reduced for cost reduction. Furthermore, since the multiplication correction by the control gain is not performed for the first compensation torque, the torque that returns the steering wheel 11 to the neutral position always acts so that good steering characteristic and good stability are maintained.

Figure 10:
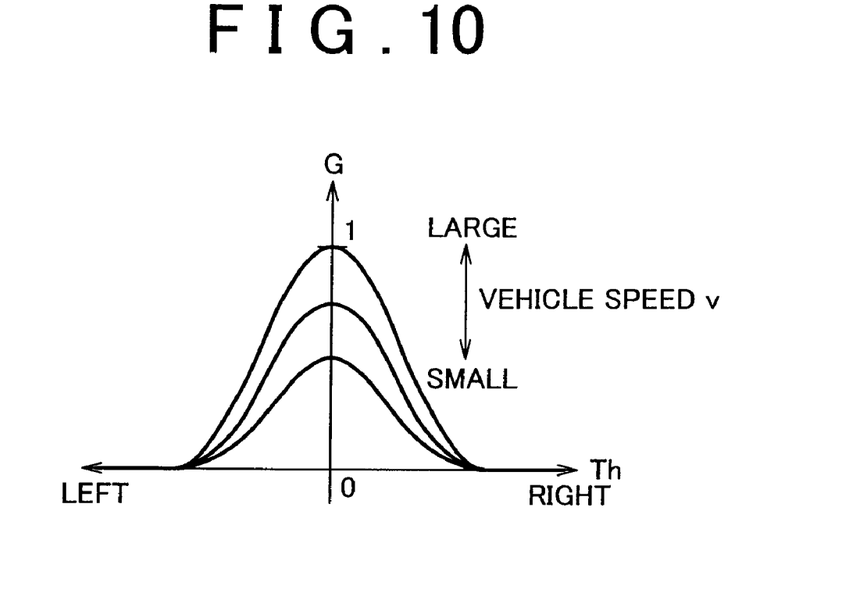
FIG. 10 is a characteristic graph showing a relationship between the steering torque and the control gain G in accordance with the vehicle speed.

Furthermore, the control gain G is set by factoring in the vehicle speed v information as well as the steering torque Th. Therefore, since the control gain G is corrected by the vehicle speed v, an appropriate compensation control amount can be calculated without interference between compensation controls. The control gain G is corrected to a value that is greater as the vehicle speed v is greater, as shown in FIG. 10. Therefore, during high-speed travel, the friction feel of the steering wheel 11 becomes relatively high, and the stable running performance improves. Besides, the compensation torque for the lane deviation of the vehicle also becomes relatively high, and the stability improves.

On the other hand, during low-speed travel, the control gain G is corrected to a small value, so that the friction feel of the steering wheel 11 lessens and the steering wheel operation becomes light. Besides, the compensation torque for the lane deviation of the vehicle becomes low, so that the compensation torque does not excessively act to cause the vehicle to follow the lane. As a result, a well-balanced compensation control torque in accordance with the vehicle speed can be obtained.

Figure 11:
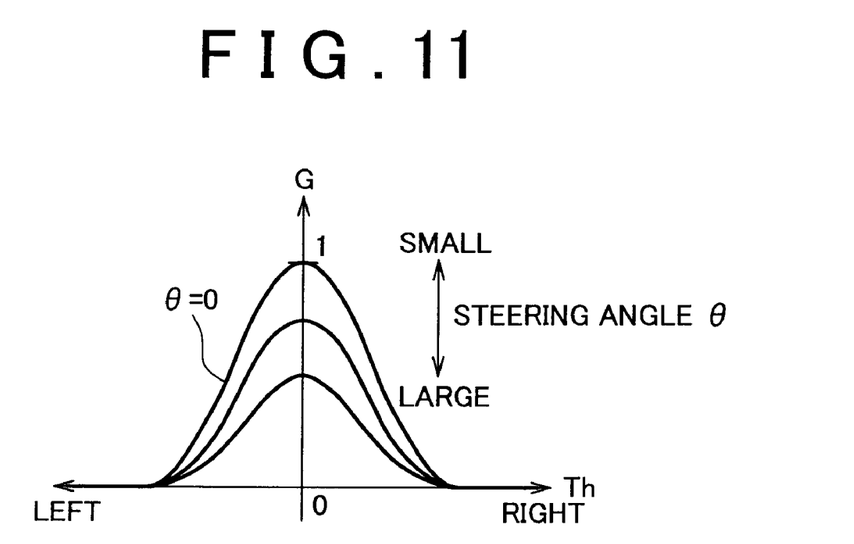
FIG. 11 is a characteristic graph showing a relationship between the steering torque and the control gain G in accordance with the steering angle.

The control gain G may be corrected in accordance with the steering angle θ as shown in FIG. 11. In this example, the control gain G is corrected to a value that is greater the smaller the steering angle θ. According to this example, while the driver is turning the steering wheel 11, the driver's intention is reflected so that compensation torque does not considerably act for the driver's operation. On the other hand, during linear travel, compensation torque favorably acts so that appropriate friction feel is obtained and the vehicle is guided in a proper direction.

In the embodiment, if an abnormality of the steering torque sensor 21 is detected, the assist control is continued with the value of the steering torque Th set at 0 (Th=0). In this case, although the value of the basic assist torque Tas becomes 0 (Tas=0), the return torque (first compensation torque T1) that returns the steering wheel 11 to the neutral position, the toque (second compensation torque T2) that gives a friction feel to the steering wheel 11, and the torque (third compensation torque T3) that causes the vehicle to run along the road center are obtained. That is, the assist control based only on the compensation control can be continued. Therefore, the functions of the electric power steering device can be fully realized.

Although an embodiment of the invention has been described above, the invention is not limited to the foregoing embodiment, but may adopt various forms and fashions without departing from the spirit of the invention. For example, although in the embodiment, the information, such as the steering angle θ, the steering angular speed ω and the lane deviation degree L, is input to calculate the three compensation control amounts, the invention is not limited so. For example, it is also permissible to acquire control command information generated by a different vehicle control system such as a VSC (Vehicle Stability Control), and to calculate a compensation control amount in coordination with the control command information.

The number of the compensation control amount calculation portions that calculate the compensation control amounts is not limited to three, but may be two, or four or more. Besides, all the compensation control amount calculation portions may be designed for the correction by the multiplication by a common control gain, or the compensation control amount calculation portions may be divided into a group of compensation control amount calculation portions designed for the multiplication by the common control gain, and a group of compensation control amount calculation portions not designed for the multiplication by the control gain. Furthermore, the number of groups designed for the multiplication by the common control gain is not limited to one, but may also be two or more.

Although the embodiment adopts a construction in which, to correct compensation control amounts (compensation torques), the compensation control amounts are summed, and the summed compensation control amount is multiplied by the control gain G, it is also permissible to correct the compensation control amounts individually by multiplying each of them by a common control gain G. Specifically, with the two compensation torques T2, T3 used in the embodiment taken as an example, the second compensation torque T2 and the third compensation torque T3 are separately corrected by multiplying each of them by the control gain G, and the corrected compensation control amounts (T2·G, and T3·G) are output to the target torque computation portion 38. In this case, too, the following arrangement is advisable. That is, if the direction of action of the total value (T2+T3) of the two compensation torques T2, T3 is different from the direction of action of the steering torque, the correction through the multiplication by the control gain G is performed. If the direction of action of the total value (T2+T3) is the same as the direction of action of the steering torque, the correction through the multiplication by the control gain G is not performed.

In the invention, the steering state information is information representing the state of steering, such as the steering torque, the steering angle, the steering angular speed, etc., and any one of the information pieces may be utilized. Besides, the vehicle state information includes not only the information that represents the vehicle speed, the vehicle longitudinal acceleration, the lateral acceleration, the vertical acceleration, the yaw rate, etc., but also vehicle state control command information or the like generated by a vehicle control system, such as the lane deviation degree L, and any one of these information pieces can be applied.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An electric power steering device comprising:
   an electric actuator that is driven to generate a steering assist torque in accordance with steering operation of a steering wheel;
   a torque information acquisition portion that acquires steering torque information regarding the steering torque input through the steering operation of the steering wheel;
   an other information acquisition portion that acquires steering state information regarding a steering state other than the steering torque information, or vehicle state information regarding a vehicle state;
   a basic assist control amount calculation portion that calculates a basic assist control amount based on at least information acquired from the torque information acquisition portion;
   a plurality of compensation control amount calculation portions that calculate compensation control amounts to compensate the basic assist control amount based on information acquired from the other information acquisition portion;
   a target assist control amount calculation portion that calculates a target assist control amount by uniting the basic assist control amount calculated by the basic assist control amount calculation portion, and the compensation control amounts respectively calculated by the plurality of compensation control amount calculation portions;
   an actuator control portion that drives and controls the electric actuator based on the target assist control amount calculated by the target assist control amount calculation portion; and
   a compensation control amount correction portion that corrects the compensation control amounts by (a) multiplying the compensation control amounts calculated by at least two or more compensation control amount calculation portions of the plurality of compensation control amount calculation portions by a control gain that changes in accordance with the steering torque information, or (b) by summing the compensation control amounts calculated by at least two or more compensation torque control amount calculation portions of the plurality of compensation control amount calculation portions and multiplying the summed compensation control amounts by the control gain.

2. The electric power steering device according to claim 1, wherein the control gain is further corrected in accordance with the steering state information other than the steering torque information, or the vehicle state information.

3. The electric power steering device according to claim 1,
   wherein the control gain is a variable equal to or greater than 0 and less than or equal to 1 which decreases as a magnitude of the steering torque in the steering torque information increases, and
   wherein the compensation control amount correction portion corrects the compensation control amount by multiplying the compensation control amount by the control gain if a control amount obtained by summing the compensation control amounts prior to being multiplied by the control gain acts in a direction opposite to the direction of the steering torque, and the compensation control amount correction portion avoids correcting the compensation control amount by the multiplication by the control gain if the control amount obtained by uniting the compensation control amounts prior to being multiplied by the control gain acts in the same direction as the steering torque.

4. The electric power steering device according to claim 1, further comprising:
   an abnormality detection portion that detects an abnormality of the torque information acquisition portion; and
   a torque information switching portion that switches to steering torque information obtained by setting at zero a magnitude of the steering torque that acts on the steering wheel, when an abnormality of the torque information acquisition portion is detected by the abnormality detection portion.

5. The electric power steering device according to claim 1, wherein the steering state information is a steering angle of the steering wheel, or a steering angular speed of the steering wheel.

6. The electric power steering device according to claim 1, wherein the vehicle state information is a lane deviation degree calculated based on a positional relationship between a vehicle and a road center line.

7. A control method of an electric power steering device that generates steering assist torque by driving an electric actuator in accordance with steering operation of a steering wheel, the control method comprising:
   acquiring steering torque information regarding the steering torque input through the steering operation of the steering wheel;
   acquiring steering state information regarding a steering state other than the steering torque information, or vehicle state information regarding a vehicle state;
   calculating a basic assist control amount based on at least the steering torque information;

calculating a plurality of compensation control amounts to compensate the basic assist control amount based on the steering state information or the vehicle state information;

calculating a target assist control amount by uniting the basic assist control amount and the plurality of compensation control amounts;

driving and controlling the electric actuator based on the target assist control amount; and correcting the compensation control amounts by (a) multiplying the plurality of compensation control amounts by a control gain that changes in accordance with the steering torque information, or (b) by summing the plurality of compensation control amounts and multiplying the summed compensation control amounts by the control gain.

* * * * *